Dec. 11, 1951        H. KERSHAW        2,578,074
WELDING MACHINE
Filed July 25, 1950        4 Sheets-Sheet 1
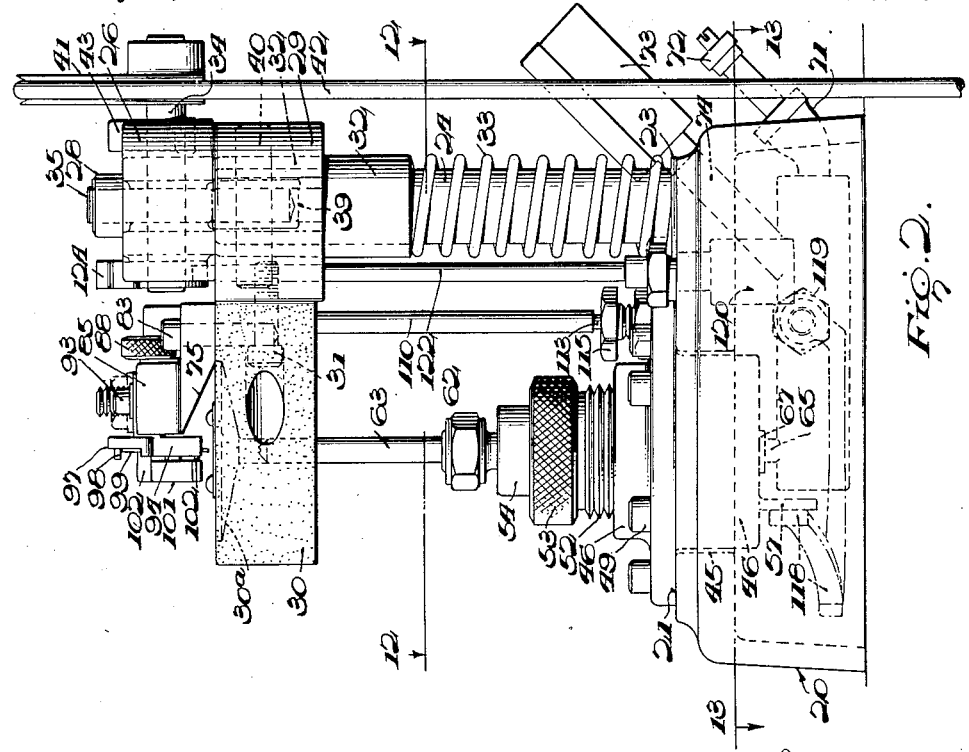
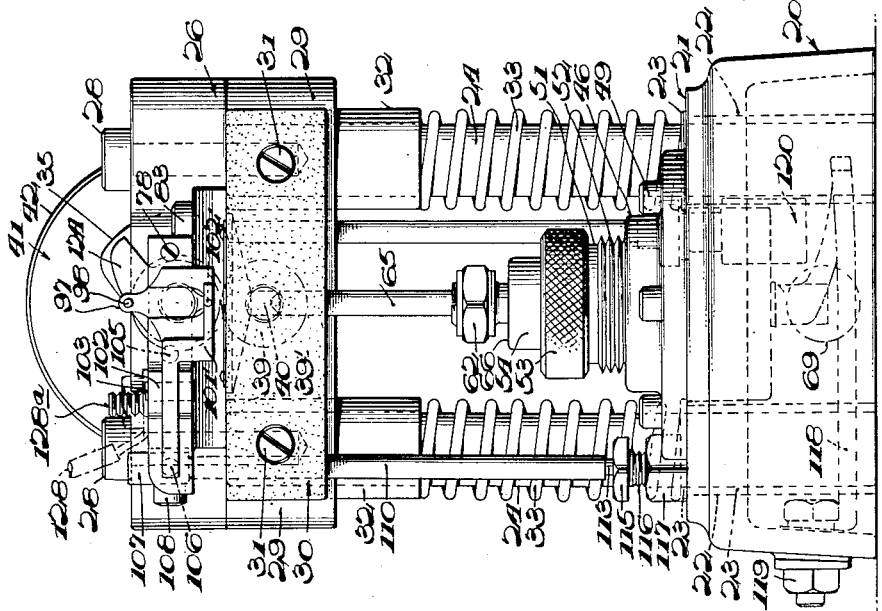
Inventor
*Henry Kershaw*.
By
Attorney Dec. 11, 1951  H. KERSHAW  2,578,074
WELDING MACHINE
Filed July 25, 1950  4 Sheets-Sheet 2
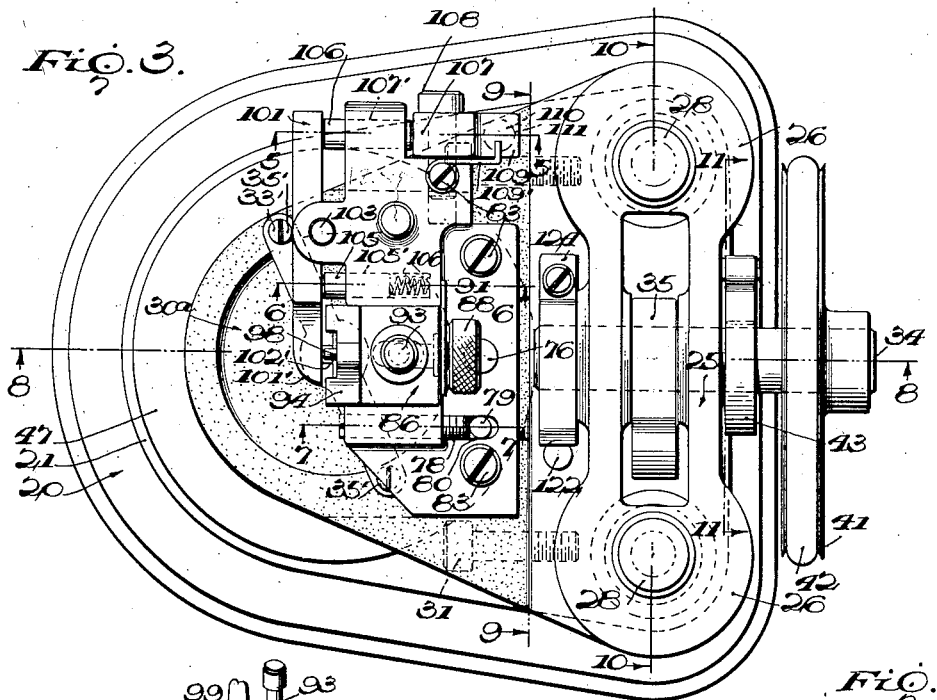
Inventor
Henry Kershaw.
Attorney Dec. 11, 1951         H. KERSHAW         2,578,074
                      WELDING MACHINE
Filed July 25, 1950                      4 Sheets-Sheet 3
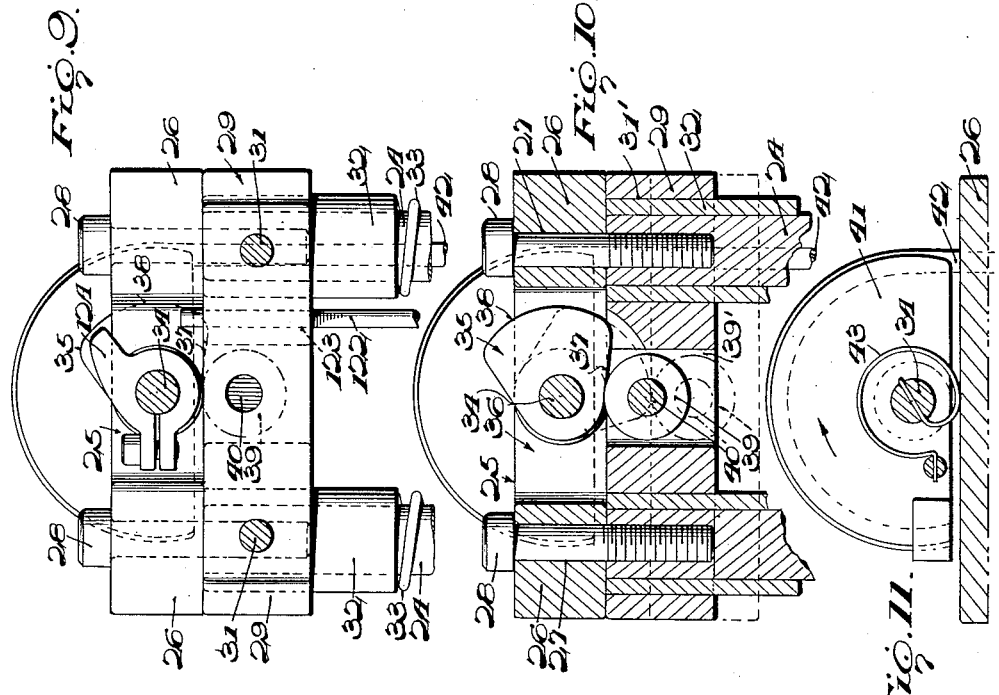
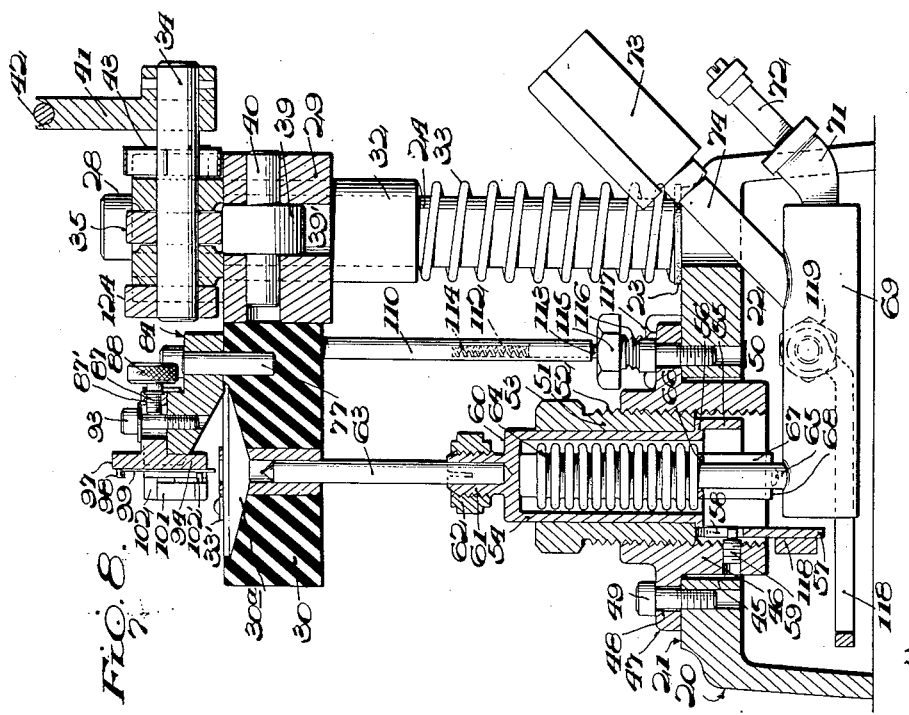
Inventor
Henry Kershaw
By
Attorney

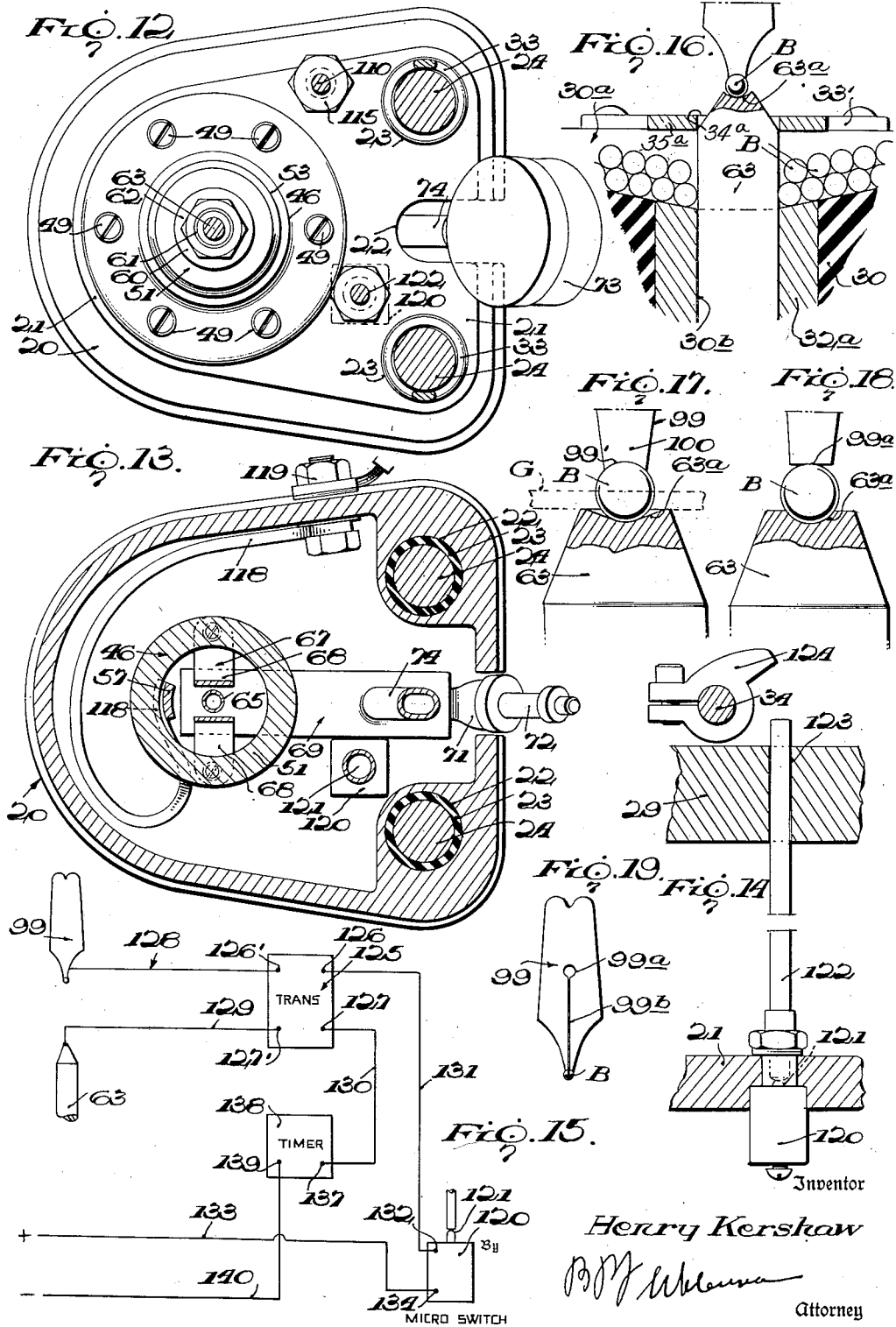

Patented Dec. 11, 1951

2,578,074

UNITED STATES PATENT OFFICE 2,578,074

WELDING MACHINE

Henry Kershaw, Belleville, N. J., assignor of one-sixth to Herbert L. Zuckerman, one-sixth to Arthur E. Zuckerman, and one-sixth to Honi Zuckerman, all of Maplewood, N. J.

Application July 25, 1950, Serial No. 175,737

8 Claims. (Cl. 219—4)

My invention relates to a welding machine.

An important object of the invention is to provide a welding machine which is extremely accurate in operation and is adapted to weld small parts.

A further object of the invention is to provide means to closely adjust the vertical distance between the pen point and balls.

A further object of the invention is to provide a welding machine which will manipulate a writing pen and writing ball, and center the ball upon the tip of the pen and weld these parts together.

A further object of the invention is to provide a welding machine which will produce a constant yielding pressure when the ball is applied to the tip of the pen, so that the pressure will instantly follow through during the welding period.

A further object of the invention is to provide adjustable means to accurately center the two metal parts being welded.

A further object of the invention is to provide means for holding a pen point, to effect the welding operation, and to permit of the ready insertion and removal of the pen point into and from the holding means.

A further object of the invention is to provide means for holding a number of the writing balls and causing the electrode to remove a single ball and hold the same in a position to contact with the pen point.

A further object of the invention is to provide means which will permit of the free movement of the electrode, yet accurately guide the same in such movement, so that the pressure will cause the movable electrode to follow through during the welding period.

A further object of the invention is to provide means to automatically close the welding circuit while the parts to be welded are under constant pressure.

Other objects and advantages of the invention will be apparent during the course of the following description.

In the accompanying drawings, forming a part of this application, and in which like numerals are employed to designate like parts throughout the same:

Figure 1 is a front elevation of a welding machine, embodying my invention,

Figure 2 is a side elevation of the same,

Figure 3 is a plan view of the machine,

Figure 4 is an exploded perspective view of the vertically movable table and associated elements, Figure 5 is a vertical section taken on line 5—5 of Figure 3, Figure 6 is a similar view taken on line 6—6 of Figure 3, Figure 7 is a similar view taken on line 7—7 of Figure 3, Figure 8 is a vertical section taken on line 8—8 of Figure 3, Figure 9 is a vertical section taken on line 9—9 of Figure 3, Figure 10 is a vertical section taken on line 10—10 of Figure 3, parts in elevation, Figure 11 is a vertical section taken on line 11—11 of Figure 3, Figure 12 is a horizontal section taken on line 12—12 of Figure 2, Figure 13 is a horizontal section taken on line 13—13 of Figure 2, Figure 14 is a side elevation of a micro-switch actuating rod and associated elements, Figure 15 is a diagrammatic view of the welding circuit, Figure 16 is an enlarged fragmentary vertical section through the insulating table showing the ball receiving recess, associated elements being in elevation, Figure 17 is an enlarged fragmentary side elevation of the pen point and ball carrying recess, showing a curved cut at the end of the pen point, Figure 18 is a similar view showing a straight cut at the end of the pen point, and, Figure 19 is a side elevation of a completed pen.

In the drawings, where for the purpose of illustration is shown a preferred embodiment of my invention, the numeral 20 designates a hollow base having a top 21. The top 21 is provided at its rear end with vertical openings 22 for receiving insulating sleeves or bushings 23, having a press-fit therein. These bushings extend a slight distance above the top 21. Having a press-fit within the bushings 23 are vertical posts 24 projecting above the top 21 for a substantial distance, as shown. It is thus seen that the posts are rigidly mounted upon the base 20 and insulated therefrom. Mounted upon the tops of the posts 24 is a horizontal transverse crosshead 25, having knuckles 26 at its ends. These knuckles have openings 27, Figure 10, for receiving clamping bolts 28 having screw threaded engagement within the upper ends of the posts 24, which are preferably tubular. Arranged beneath the stationary crosshead 25 is a vertically movable horizontal carriage 29, formed of metal and having a horizontal table 30 rigidly secured thereto by bolts 31 or the like. This horizontal table is formed of insulating material. The carriage 29 has vertical openings 31' formed therein receiving guide sleeves 32, having a press-fit therein, and these guide sleeves are slidable upon the posts 24. The guide sleeves engage compressible coil springs 33, surrounding the posts 24 and resting upon the upper ends of the insulating sleeves 23. Rotatably mounted upon the crosshead 25 is a horizontal longitudinal shaft 34, having a cam 35 rigidly mounted thereon, and operating within an opening 36, Figure 10, formed in the crosshead. This cam has a lower radial face 37 and an end face 38, which is concentric with the shaft 34. The cam 35 is above and in alignment with a roller 39, secured to the carriage 29 by a pin 40, and operating in an opening 39'. A segmental grooved pulley 41 is rigidly mounted upon the rear end of the shaft 34 and has a flexible element or cable 42 secured thereto and passed about the same. This cable, when pulled downwardly, will turn the segmental pulley clockwise, Figure 10. This action will cause the radial face 37 of the cam to engage with the roller 39 and further movement of the cam 35 brings the curved end portion 38 of the cam 35 into engagement with the roller 39. The carriage 29 is therefore lowered and reaches its lowermost position when the curved end face 38 engages the roller 39, and further clockwise turning movement of the shaft 34, Figure 10, will not move the carriage 29 downwardly further. This is important since the selected yielding pressure is determined when the carriage 29 has reached a selected lowered position and it is not desirable that the pressure be increased but should remain constant during the welding period. The cable 42 may be moved downwardly by any suitable means such as a foot pedal. The shaft 34 is turned counter-clockwise, Figure 10, by means of a coil spring 43, Figure 11, one end of which is anchored to the shaft 34 and its opposite end anchored to the crosshead 26. When the cable 42 has been moved downwardly and released, the shaft 34 is turned counter-clockwise by the spring 43, so that the end face 38 is moved out of engagement with the roller 39 and the parts will assume the starting position, Figure 1.

The base top 21 has a large cylindrical vertical opening 45 to receive a collar 46 of slightly smaller diameter. This collar is provided between its ends with a horizontal flange 47, resting upon the top 21. This flange has vertical openings 48 to receive bolts 49 which are tapped into the openings 50 in the top. The openings 48 are slightly larger in diameter than the bolts 49 so that the sleeve 46 may be slightly radially adjusted upon the top 21, and subsequently clamped to the top in the selected adjusted position. An inner vertically adjustable stop sleeve 51 has a screw threaded portion 52 to engage within the screw threaded opening of the outer sleeve 46. The adjustable stop sleeve has an upper knurled head 53, by means of which the adjustable stop sleeve may be readily turned. Slidably mounted within the stop sleeve 51 is a tube 54, having a radially enlarged end 55, providing an upper horizontal shoulder 56 to engage with the stop sleeve 51. The enlarged end 55 carries a depending extension 57 and the longitudinal vertical slot 58 is formed in the enlarged lower end 55 and passes through the shoulder 56. This slot receives the end of a screw 59 tapped into the stop sleeve 46. In assembling, the tube 54 is inserted upwardly through the lower end of the stop sleeve 51 and extends above this sleeve 51 and the tube 54 has a closed end 60, carrying an adjustable chuck, including a split socket 61 having its periphery tapered and threaded, to engage with the clamping ring nut 62. This chuck receives and holds a lower vertical electrode 63, which may be formed of copper or the like. Mounted within the tube 54 is the metallic pneumatic bellows 64, which is longitudinally expansible. The upper end of this bellows is closed and contacts with the end 60. The lower end of the bellows is closed and is connected with a pipe 65, leading into the bellows. This pipe extends through an opening 66 formed in an inverted U-shape bracket 67, having horizontal extensions 68, which are secured to the lower edge of the sleeve 46 by screws or the like. At its top, the bellows bears against the end 60 and at its bottom against the bracket 67.

Mounted within the hollow bottom 20, is a horizontal pressure reserve tank 69, having the pipe 65 secured thereto by solder or the like. A coupling 71 leads into the outer end of the tank 69 and is connected with a valve unit 72, such as is employed upon a pneumatic tire. A bicycle pump or the like may be connected with the valve unit 72 to produce the desired air pressure in the tank 69 and bellows 64. This pressure will remain constant except for slow leakage which would require additional supply of air pressure. The degree of air pressure is indicated by a guage 73 connected with the tank 69 by a pipe 74. I employ low pressure in the welding and the pressure within the tank and bellows may be from 15 to 20 pounds per square inch.

Mounted upon the insulating table 30 near the stationary crosshead 26 is a base plate 75, provided at its longitudinal center with an opening 76 for receiving a vertical pivot 77 rigidly secured to the table 30. This will permit of a limited horizontal swinging movement of the base plate in opposite directions. The horizontal adjustment may be effected by means of a screw 78, arranged to contact with a fixed pin 79, operating within an elongated opening 80 in the base plate, and this fixed pin is rigidly mounted upon the table 30. The base plate 75 has a pair of large openings 82, to receive clamping bolts 83, which are tapped into the table 30. It is thus seen that the base plate may be swung or adjusted about a vertical axis in either direction and clamped in the selected adjusted position.

Arranged above the base plate 75 and formed integral therewith is a horizontal block 84 provided near one end with a transverse recess 85, slidably receiving a horizontal carriage 86. This carriage is provided at one end with a horizontal screw threaded opening 87' for receiving a horizontal screw 87, having a knurled head 88. This screw has a grooved hub 89 engaging within a slot 90 formed in a stationary stop plate 91, rigidly secured to the block 84. It is thus seen that the screw 87 is free to turn but cannot move longitudinally with respect to the block and will longitudinally adjust the carriage 86. The carriage is also provided with an elongated opening 93' to receive a vertical screw 93 which is tapped into the block 84. It is thus seen that after the carriage has been longitudinally adjusted, it may be clamped to the block in the selected adjusted position by means of the screw 93. Formed integral with the carriage 86, is a depending vertical holder block 94, provided upon its outer face with an upstanding recess 95, provided at its lower end with a reduced extension 96. The holder block is provided at its top with a vertical arm 97, carrying an outwardly extending horizontal stop pin 98. The numeral 99 designates a pen point. When the pen point is inserted into the recess, its reduced end 100 passes into the reduced extension 96 and the upper end of the pen point engages beneath the stop pin 98. Particular attention is called to the fact that the central longitudinal axis of the pivot 77, the central longitudinal axis of the carriage 86, and the central longitudinal axis of the recess 95, are in alignment and remain in such alignment.

Disposed upon the front face of the block 84 is a horizontally swinging lever 101, arranged between and pivoted to knuckles 102 by means of a pin 103. Arranged upon that side of the pivot 103, next to the holder block 94, is a plunger 105, slidably mounted in a transverse opening 105' in the block 84 and moved forwardly by a spring 106'. The free end of the plunger 105 contacts with the lever 101. When the lever is free, this spring pressed plunger 105 swings the right end of the lever adjacent to the holder block 94 outwardly from the holder block. The opposite end of the lever 101 engages a plunger 106, slidable in a horizontal transverse opening 107' formed in the block 84. The opposite end of the plunger projects beyond the corresponding end of the block 84. The forward end of the plunger 106 engages the end of the lever 101 and its rear end is in the path of travel of a cam 107, mounted upon a horizontal pivot 108. This pivot is secured to the block 84. This cam has a radial arm 109, returned to the lowered position by a spring 109'. When the radial arm is swung upwardly, the cam 107 moves the plunger 106 forwardly and this plunger then swings the lever 101 upon its pivot so that the end of the lever next to the holder block 94 is shifted toward the holder block. The end of the lever 101 next to the holder block is offset downwardly forming a horizontal arm 101', carrying a laterally extending lug or finger 102', movable into the reduced extension 96 of the recess to contact with the reduced end of the pen point and clamp the same to the bottom wall of the recess 95. Arranged beneath and in alignment with the arm 109 is a vertical trip shaft 110, slidable within an opening 111 formed in the table 30. This shaft is provided at its lower end with a longitudinal bore 112, to receive a rod 113 slidable therein and a compressible coil spring 114 is arranged within the bore above the rod. This spring 114 is stiffer than the spring 109'. This rod is formed integral with the head 115 of a bolt 116 having screw threaded engagement within an opening 116' formed in the top 21 and carrying a lock nut 117. It is obvious that the trip rod 110 may be vertically adjusted by turning the bolt 115. When the carriage 29 is moved downwardly the arm 109 of the cam 107 contacts with the rod 110 and the arm 109 is swung upwardly and the cam 107, through the medium of a plunger 106, will then swing the lever 101 upon its pivot, so that the extension or lug 102' will engage against the reduced end 100 of the pen point and clamp the pen point in place within the recess 95.

The insulating table 30 is provided upon its top with a tapered or conical recess or pocket 30a and has a vertical opening 30b which is concentric with the recess 30a and leads into the bottom of this recess. A metallic guide sleeve or bushing 32a has a press-fit within the opening 30a and receives the electrode 63. There is a slight clearance between this electrode and the guide sleeve 32a such as .010 of an inch so that the friction is reduced to a minimum between the electrode and sleeve 32a. Arranged upon the top of the table 30 and extending diametrically thereof is a guide strip 33', formed of metal and this guide strip has openings 34' to receive screws 35' which rigidly attach the guide strip to the table. The openings 34' are larger than the screws 35' whereby the strip 33' may be adjusted within limits. This strip has a central head 35ª, provided with a central opening 34ª and the electrode 63 enters the opening 34ª when the table 30 moves downwardly. The electrode has a sliding guide fit within the opening 34ª, but the head 35' is relatively thin and the amount of friction between the contacting parts is reduced to the minimum, thus allowing the bellows to cause the electrode 63 to properly follow through during the welding period. The balls or pellets B which are formed of iridium have a diameter of .028 of an inch to .035 of an inch and these balls or pellets are held within the recess 30a. The upper end of the electrode 63 is tapered upwardly and this tapered end is provided with a spherically curved recess 63a, for receiving the lower portion of the ball which is held within the recess and projects above the electrode. Due to the size of the recess 63a, only one ball B can be held upon the upper end of the electrode, and this ball is separated out from the other balls and is positioned above the guide head 35' when the table 30 descends. The lower portion of the base plate 75 is cut away at 75' so that the base plate cannot contact with the balls or pellets.

A heavy flexible wire 118 is connected with the base 20 by means of a binding post 119. This wire is in the form of a coil and its opposite end is electrically connected with the extension 57 of the stop sleeve 51 and hence in electrical connection with the electrode 63. Mounted within the base 20 is a micro-switch 120 including a button 121 adapted to be depressed by a vertical switch rod 122. This switch rod is slidably mounted in an opening 123 formed in the carriage 29. This switch rod projects above the carriage and is in the path of travel of a cam 124, clamped upon the front end of the shaft 36. The cam 124 is in a trailing position with respect to the leading face 37 of the cam 35, when the cam is turned to depress the carriage 29. The arrangement is such that the cam 35 will first move the carriage 29 to the lowermost position and hold it in such lowermost position, and shortly after this the cam 124 will depress the cam rod 122 which will close the micro-switch 120. The micro-switch remains closed until the carriage is returned to the upper position.

As shown in Figure 15, the numeral 125 designates a step-down transformer, having primary binding posts 126 and 127, and secondary binding posts 126' and 127'. The binding post 126' is connected with a wire 128 connected with a binding post 128a, Figure 1, and hence the wire 128 is electrically connected with the pen point 99. The binding post 127' is connected with a wire 129 which is connected with a binding post 119 and hence is electrically connected with the electrode 63. The primary binding post 126 is connected with a wire 131, connected with one post 132 of the micro-switch. A lead wire 133 is connected with the other binding post 134 of the micro-switch. The other primary binding post 127 of the transformer is connected with the wire 130 connected with one binding post 137 of a timer 138, and the other binding post 139 of the timer is connected with the opposite lead wire 140.

The pen point 99 may be stamped to provide a circularly curved recess 99' at the lower end of the reduced portion or point 100. When this practice is followed, the circularly curved recess 63a at the reduced end of the electrode is of greater diameter than the ball B. The ball B will center itself by gravity in the recess 63a, and then be capable of moving laterally slightly therein whereby the ball can automatically center itself in the curved recess 99'. The lower end 100 of the pen point may be stamped straight, as shown at 99a and when this practice is followed the recess 63a is formed of a size to snugly receive the lower portion of the ball, which cannot shift laterally within the recess 63a.

The operation of the apparatus is as follows: The springs 33 hold the carriage in the raised position, and the arm 109 is in the lowered position. The spring 43 has returned the shaft 34 to the starting position and the cams 35 and 124 are in the raised position. The spring-pressed plunger 105 now holds the lever 101 in the outer position whereby the clamping extension 102' is out of the reduced recess extension 96 of the pen receiving recess 95 and the plunger 106 is shifted toward the cam 107 and may contact therewith. The pen 99 is then inserted into the recess 95, and its reduced end enters the reduced recess extension 96 and the edges of the pen contact with the side walls of the recess and the upper end of the pen is positioned beneath the stop pin 98. The operator then pulls the cable 42 downwardly, by depressing a pedal or the like. The carriage 29 descends and the end 109 of the cam 107 engages the upper end of the trip rod 110, having its downward movement opposed by the spring 114. This trip rod swings the arm 109 upwardly and the cam 107 engages the plunger 106 and shifts the corresponding end of the lever forwardly while its opposite end is shifted rearwardly and the extension 102' brought into yielding clamping engagement with the reduced end of the pen, securely holding the pen from moving out of the front open side of the recess 95. The stop pin 98 prevents the upward movement of the pen within the recess. The pen is also held in good electrical contact with the holder block 94. This yielding clamping engagement is applied to the pen point before the reduced end 100 of the pen point contacts with the ball B. The continued downward movement of the carriage 29 and table 30 causes the ball B held within the recess 63a to be positioned above the guide head 35a and the reduced end of the pen 100 is brought into engagement with the ball B and the further downward movement of the pen point forces the ball B downwardly in opposition to the upward resilient or yielding action of the bellows 64. A yielding pressure is therefore applied between the ball and the reduced end of the pen point. The radial face 37 of the cam 35 moves the carriage to the lowermost position, which is defined by the curved face 38 of the cam riding upon the roller 39. Further turning movement of the shaft 34 will not cause the carriage 29 to move further downwardly. This will provide a measured compression of the resilient bellows 64 and a predetermined low pressure between the ball B and the reduced end 100 of the pen point, such as from 15 to 20 pounds per square inch. Further slight turning movement of the shaft 34 will then cause the cam 124 to engage the rod 122 which moves downwardly and actuates the micro-switch 120 which closes the welding circuit. The time that the welding circuit remains closed is controlled by the timer 138 which may be approximately from 1 to 2 cyles, each cycle being 1/60 of a second. The welding current during this period is supplied to the ball and the reduced end 100 of the pen point, and the contacting parts are welded by the metal being plasticized, as is well known in welding. The ball is welded or fused to the reduced end of the pen point. After the welding has been effected the pressure is removed from the pedal and the spring 43 returns the carriage to the raised position and all other parts are returned to the normal starting position. After the welding circuit has been opened by the timer, at the end of the welding period, the timer will not again close the welding circuit until pressure is removed from the button 121 of the micro-switch and the button again depressed. The clamping extension 102' of the lever 101 is now shifted forwardly from the pen and this pen then manually removed from within the recess 95.

Before starting the welding operation, and before the balls B are loaded in the recess 30a, a pen point 99 is inserted into the recess and a gauge G is placed upon the top of the electrode 63 which does not carry a ball. The recess 63a is preferably less in depth than the radius of the ball, and the recess 99' is also preferably less than the radius of the ball. The cable 42 is pulled downwardly to move the carriage 25 to the lowermost position. If the gauge G does not contact with the lower end of the pen point, the sleeve 51 is turned to raise the electrode 63 until the contact is made. The gauge preferably has a thickness less than the radius of the ball. With the parts thus adjusted, the lower end of the pen point will not contact with the electrode 63, when the carriage moves to the lowermost position, and the electrode 63 does not carry a ball, so that the pen point will not be welded to the electrode. It is obvious that the starting distance between the pen point and the electrode 63 may be varied by adjusting the sleeve 51, and hence the bellows 64 will be compressed for different degrees, as may be found advantageous.

After the ball B is welded to the pen point, the pen point is formed into the transversely curved shape and an opening 99a is stamped therein. The pen point is then provided with a slit 99b which is made from the opening 99a and extends through the ball B.

It is to be understood that the form of my invention herewith shown and described is to be taken as a preferred example of the same, and that various changes in the shape, size, and arrangement of parts may be resorted to without departing from the spirit of my invention or the scope of the subjoined claims.

Having thus described my invention, I claim:

1. In a welding machine, a support, a substantially vertical stop sleeve having screw-threaded engagement with the support for vertical adjustment, a substantially vertical tube slidably mounted within the sleeve and having a part to contact with the sleeve to limit the upward movement of the tube with relation to the sleeve, a resilient pneumatic bellows mounted within the tube for opposing the downward movement of the tube, a relatively stationary element engaging the lower end of the pneumatic bellows for holding such lower end against downward movement, a substantially vertical electrode mounted upon the upper end of the tube and extending above the same, said electrode being provided at its upper end with a recess of a size for receiving a single ball, substantially vertical guide means mounted upon the support and extending above the tube, a substantially vertically reciprocatory carriage mounted upon the guide means and including a part provided with a recess for holding the balls and having a substantially vertical opening leading into the recess, the electrode extending into the opening and being arranged within the recess and above the bottom of the recess when the carriage is moved downwardly, a device connected with the carriage to reciprocate therewith and arranged above the recess, said device including means for holding a pen point with its reduced end disposed permanently lowermost and in substantial alignment with the ball held within the recess of the electrode, means to lower the carriage a predetermined distance and to raise the same, and a welding circuit electrically connected with the electrode and the pen point holding device.

2. In a welding machine, a support having a substantially vertical screw-threaded opening open at its top and bottom, a substantially vertical stop sleeve having screw-threaded engagement within the screw-threaded opening and projecting above the screw-threaded opening to be turned for vertical adjustment, a substantially vertical tube mounted within the stop sleeve and having its top closed and projecting above the stop sleeve and having its lower end open and provided adjacent to such lower end with a shoulder to engage the lower end of the stop sleeve to limit the upward movement of the tube with relation to the sleeve, a resilient pneumatic bellows mounted within the tube for opposing its downward movement and having its upper end engaging the upper closed top of the tube, an element engaging the lower end of the pneumatic bellows for holding such lower end against downward movement and secured to the support, a substantially vertical electrode mounted upon the upper closed end of the tube and extending above the same, said electrode being provided at its upper end with a recess of a size for receiving a single ball, substantially vertical guide means mounted upon the support and extending above the tube, a substantially vertically reciprocatory carriage mounted upon the guide means and including a part provided with a recess for holding the balls and having a substantially vertical opening leading into the recess, the electrode extending into the opening and being arranged within the recess above the bottom of the recess when the carriage is moved downwardly, a device for holding a pen point with its reduced end disposed permanently lowermost, means to mount the device upon the carriage and arranging the pen holding device so that the held pen point will be in substantial alignment with the ball held within the recess of the electrode, means to lower the carriage a predetermined distance and raise the same, and means for electrically connecting the welding circuit with the electrode and pen point holding device.

3. In a welding machine, a support, a substantially vertical stop sleeve vertically adjustable mounted upon the support, a substantially vertical tube slidably mounted within the sleeve and having a part to contact with the sleeve to limit the upward movement of the tube with relation to the sleeve, a resilient pneumatic bellows mounted within the tube for opposing the downward movement of the tube, a relatively stationary element engaging the lower end of the pneumatic bellows for holding such lower end against downward movement, a substantially vertical electrode mounted upon the upper end of the tube and extending above the same, said electrode being provided at its upper end with a recess of a size for receiving a single ball, substantially vertical guide means mounted upon the support and extending above the tube, a substantially vertically reciprocatory carriage mounted upon the guide means and including an insulating table provided with a recess for holding the balls and having a substantially vertical opening leading into the recess, the electrode extending into the opening and being arranged within the recess and above the bottom of the recess when the carriage is moved downwardly, a device for holding a pen point with its reduced end disposed permanently lowermost, means to mount the device upon the insulating table and arranging the pen holding device so that the held pen point will be in substantial alignment with the ball held within the recess of the electrode, a cam pivotally mounted upon the guide means and having a radial face and a circularly curved face concentric with the pivot of the cam, means to turn the cam, the radial cam face engaging a part of the carriage for moving it downwardly a predetermined distance and the circularly curved face engaging such part without further moving the carriage downwardly beyond the predetermined distance, means to raise the carriage, and means for electrically connecting a welding circuit with the electrode and pen point holding device.

4. In a welding machine, a support, a substantially vertical electrode mounted upon the support and provided at its upper end with a recess for receiving a single ball, susbtantially vertical guide means mounted upon the support, a vertically reciprocatory carriage mounted upon the guide means, a pen point holding device mounted upon the carriage for movement therewith and including a block, said block being provided with a substantially vertical recess open at one side for receiving a pen point, said recess being provided at its bottom with a reduced extension to receive the reduced end of the pen point, a stop element secured to the upper end of the block and held stationary with relation thereto and extending across the recess to contact with the upper end of the pen point, a horizontally swinging lever pivotally mounted upon the carriage adjacent to the open side of the recess and having its free end arranged adjacent to the lower end of the recess and provided with an extension to clamp against the lower end of the pen point, the major portion of the pen point extending above the free end of the lever so that the pen point may be manually inserted and removed when the lever is in the open position, automatic means to move the free end of the lever to the open position when the carriage is moved upwardly and to the closed clamping position when the carriage is moved downwardly, means to raise and lower the carriage, and means for electrically connecting the electrode and the block with a welding circuit.

5. In a welding machine, a support, a substantially vertical electrode mounted upon the support and provided at its upper end with a recess for receiving a single ball, substantially vertical guide means mounted upon the support, a vertically reciprocatory carriage mounted upon the guide means, a base plate, means to mount the base plate upon the carriage so that the base plate may be angularly adjusted in a substantially horizontal plane and locked to the carriage in the selected adjusted position, a second carriage, means to mount the second carriage upon the base plate so that the second carriage can be shifted in a straight line in a substantially horizontal plane transversely of the base plate and locked to the base plate in the selected adjusted position, a pen point holding block secured to the second carriage and having a substantially vertical recess formed therein having a reduced extension at its lower end, the recess holding the pen point with the reduced end of the pen point permanently in the lowermost position, releasable means for clamping the pen point within the recess, means to raise and lower the carriage, and means for electrically connecting the welding circuit with the electrode and the pen point holding block.

6. In a welding machine, a support, a substantially vertical electrode mounted upon the support, substantially vertical guide means mounted upon the support, a vertically reciprocatory carriage mounted upon the guide means, a pen point holding device rigidly mounted upon the carriage for movement therewith and having a recess for holding the pen point with the reduced end of the pen point arranged permanently lowermost, a horizontally swinging lever mounted upon the carriage and having an extension for clamping engagement with the pen point within the recess, means to swing the lever in one direction so that its extension has clamping engagement with the pen point including a cam having an extension, a spring to move the cam to the inactive position, a trip rod arranged beneath the extension of the cam and in the path of travel of the same to swing the cam to the active position when the carriage is moved downwardly, a spring to oppose the downward movement of the trip rod and being stiffer than the first-named spring, means to raise and lower the carriage, and means for electrically connecting a welding circuit with the electrode and the pen point holding device.

7. In a welding machine, a support, a substantially vertical electrode mounted upon the support and provided at its upper end with a recess for receiving one ball, substantially vertical guide means mounted upon the support, a vertically reciprocatory carriage mounted upon the guide means and including an engaging part and a table, said table being provided with a recess for receiving balls and a substantially vertical opening leading into the recess, the opening receiving the upper end of the electrode, the upper end of the electrode being arranged within the recess so that the recess of the electrode picks up one ball when the carriage is moved downwardly, a pen point holding device having a recess provided with a reduced lower end for receiving the pen point and retaining the reduced end of the pen point permanently in the lowermost position, a rock shaft mounted upon the upper end of the guide means, a cam mounted upon the rock shaft and having a radial face and a circularly curved face concentric with the rock shaft, the cam being arranged to engage the engaging part of the carriage, the radial face moving the carriage downwardly for a predetermined distance and the circularly curved face preventing the further downward movement of the carriage after the action of the radial face, means to raise the carriage, means to turn the rock shaft, a welding circuit connected with the pen point holding device and the electrode and including a switch, means to close the switch, and a second cam mounted upon the rock shaft and having a cam face for operating the switch closing means, the cam face of the second cam being arranged in a trailing position with respect to the radial face of the first cam so that the second cam will close the switch after the first cam moves the carriage downwardly.

8. In a welding machine, a support, a substantially vertical electrode mounted upon the support and provided at its upper end with a recess for receiving a single ball, substantially vertical guide means mounted upon the support, a substantially vertically reciprocatory carriage mounted upon the guide means and including a table having a recess for receiving the balls and a substantially vertical opening leading into the recess, the substantially vertical opening being larger in diameter than the electrode so that the electrode is free from contact with the wall of the opening, a substantially horizontal thin guide strip mounted upon the upper end of the table and having an opening to receive the electrode and having a sliding fit therewith, a pen point holding device arranged above and in close relation to the thin guide strip and having a recess for receiving the pen point with its reduced end arranged permanently lowermost, means to move the carriage downwardly so that the electrode recess picks up a single ball and will pass into the opening of the thin guide strip and be accurately centered with relation to the reduced end of the pen point, and means for connecting a welding circuit with the electrode and the pen holding device.

HENRY KERSHAW.

REFERENCES CITED

The following references are of record in the file of this patent:

UNITED STATES PATENTS

| Number | Name | Date |
| --- | --- | --- |
| 1,061,378 | Heany | May 13, 1913 |
| 1,370,511 | Boercker | Mar. 8, 1921 |
| 1,490,191 | Allcutt | Apr. 15, 1924 |
| 1,548,397 | Taylor | Aug. 4, 1925 |
| 2,154,243 | Langhams | Apr. 11, 1939 |
| 2,299,543 | Humphrey | Oct. 20, 1942 |
| 2,308,658 | Jendressen | Jan. 19, 1943 |
| 2,308,659 | Jendressen | Jan. 19, 1943 |
| 2,355,576 | Werfel | Aug. 8, 1944 |

FOREIGN PATENTS

| Number | Country | Date |
| --- | --- | --- |
| 544,047 | Great Britain | Mar. 25, 1942 |